(12) United States Patent
Iwasaki et al.

(10) Patent No.: US 7,759,289 B2
(45) Date of Patent: Jul. 20, 2010

(54) ACTIVATED CARBON, METHOD FOR PRODUCTION THEREOF, POLARIZING ELECTRODE AND ELECTRICAL DOUBLE LAYER CAPACITOR

(75) Inventors: Hideharu Iwasaki, Okayama (JP);
Nozomu Sugo, Okayama (JP);
Mitsunori Hitomi, Okayama (JP);
Shushi Nishimura, Okayama (JP);
Takeshi Fujino, Saitama (JP); Shigeki Oyama, Saitama (JP); Yuji Kawabuchi, Saitama (JP)

(73) Assignees: Kuraray Chemical Co., Ltd., Bizen-shi (JP); Honda Giken Kogyo Kabushiki Kaisha, Tokyo (JP)

( * ) Notice: Subject to any disclaimer, the term of this patent is extended or adjusted under 35 U.S.C. 154(b) by 1077 days.

(21) Appl. No.: 10/519,399

(22) PCT Filed: Jul. 3, 2003

(86) PCT No.: PCT/JP03/08464
§ 371 (c)(1), (2), (4) Date: Jan. 4, 2005

(87) PCT Pub. No.: WO2004/011371
PCT Pub. Date: Feb. 5, 2004

(65) Prior Publication Data
US 2005/0266990 A1   Dec. 1, 2005

(30) Foreign Application Priority Data

| Jul. 30, 2002 | (JP) | 2002-221793 |
| Jul. 30, 2002 | (JP) | 2002-221796 |
| Sep. 10, 2002 | (JP) | 2002-263684 |
| Sep. 10, 2002 | (JP) | 2002-263708 |

(51) Int. Cl.
*C01B 31/08* (2006.01)

(52) U.S. Cl. ............... 502/416; 502/427; 502/428
(58) Field of Classification Search ......... 502/426–427, 502/416
See application file for complete search history.

(56) References Cited

U.S. PATENT DOCUMENTS 2,567,468 A * 9/1951 Berl ..................... 502/427

(Continued)

FOREIGN PATENT DOCUMENTS

JP        01-102913        4/1989

(Continued)

OTHER PUBLICATIONS

Rodriguez-Reinoso, et al., The Use of Steam and CO2 as Activating Agents in the Preparation of Activated Carbons, Carbon 1995: 33(1): 15-23.*

(Continued)

*Primary Examiner*—Stanley S. Silverman
*Assistant Examiner*—Daniel C. McCracken
(74) *Attorney, Agent, or Firm*—Oblon, Spivak, McClelland, Maier & Neustadt, L.L.P.

(57) ABSTRACT

In activated carbon obtained by subjecting a carbonaceous material to an activation treatment, the overall content of alkali metals is set at 100 ppm or less, or the overall content of heavy metals is set at 20 ppm or less and the overall content of alkali metals is set at 200 ppm or less. In cases where such activated carbon is used as a raw material in electronic devices, the formation of dendrites by the reductive deposition of alkali metals or heavy metals tends not to occur, so that problems such as short-circuiting or the like tend not to arise, and a good rate of self-discharge retention is shown.

9 Claims, 1 Drawing Sheet

U.S. PATENT DOCUMENTS

| | | | |
|---|---|---|---|
| 5,064,805 A * | 11/1991 | Otowa | 502/427 |
| 5,883,040 A * | 3/1999 | Armstrong et al. | 502/437 |
| 5,891,822 A * | 4/1999 | Oyama et al. | 502/427 |
| 6,225,256 B1 * | 5/2001 | Shawabkeh et al. | 502/424 |
| 6,258,337 B1 * | 7/2001 | Sonobe et al. | 423/445 R |
| 6,589,904 B1 | 7/2003 | Iwasaki et al. | |
| 2002/0048144 A1 | 4/2002 | Sugo et al. | |
| 2002/0096661 A1 * | 7/2002 | Shinozaki et al. | 252/500 |
| 2005/0047061 A1 | 3/2005 | Sugo et al. | |

FOREIGN PATENT DOCUMENTS

| | | |
|---|---|---|
| JP | 01-241811 | 9/1989 |
| JP | 2000-034113 | 2/2000 |
| JP | 3038676 | 3/2000 |
| JP | 2002-043189 | 2/2002 |
| JP | 2002-043190 | 2/2002 |

OTHER PUBLICATIONS

Nakamura, et al., Influence of physical properties of activated carbons on characteristics of electric double-layer capacitors, J. Pwr. Sources 1996; 60: 225-231.*

Recommended Terminology for the Description of Carbon As a Solid, Pure & Appl. Chem. 1995; 67(3): 473-506.*

* cited by examiner

ACTIVATED CARBON, METHOD FOR PRODUCTION THEREOF, POLARIZING ELECTRODE AND ELECTRICAL DOUBLE LAYER CAPACITOR

TECHNICAL FIELD

The present invention relates to activated carbon, a method for manufacturing the same, a polarizing electrode and an electrical double layer capacitor. In addition to applications such as washing, cleaning, recovery, gas storage, decoloring and the like that utilize the adsorption performance of the activated carbon of the present invention, the activated carbon of the present invention is suitable for use in electrical devices that utilize the characteristic low content of alkali metals and/or heavy metals in the activated carbon, especially in electrodes for secondary batteries and electrical double layer capacitors.

BACKGROUND ART

Activated carbon is widely used in the food industry, chemical industry, pharmaceutical industry and various other industries; in concrete terms, examples of use include applications such as clean water manufacturing applications, air cleaning applications, solvent recovery applications, stack effluent desulfurization and denitrogenization applications, decoloring applications, tap water treatment, sewage treatment, treatment of feces and urine, industrial waste water treatment, sugar refining applications, nuclear power applications (adsorption of radioactive substances), methane occlusion, hydrogen occlusion and the like. These applications mainly utilize the adsorption performance of activated carbon. But, the activated carbon as an adsorbing agent that is more superior in terms of adsorption performance is desired.

In recent years, meanwhile, electrical double layer capacitors have attracted attention as back-up power supplies, auxiliary power supplies and the like, and development focusing on the performance of activated carbon as electrodes used in electrical double layer capacitors has been widely undertaken. Electrical double layer capacitors which use activated carbon in polarizing electrodes are superior in terms of electrostatic capacitance; accordingly, along with development in the field of electronics, there has been a rapidly growing demand in electronic device electrode applications and the like. Recently, furthermore, in addition to miniaturization in conventional memory back-up power supplies and the like, there has also been development of high-capacitance products used in the auxiliary power supplies of motors and the like.

Among these fields of utilization of activated carbon, activated carbon that contains no alkali metals or heavy metals is preferable in the fields of food products, drug manufacture, clean water and electronic devices. Conventionally, therefore, methods for manufacturing activated carbon have generally been methods in which a carbonaceous material is subjected to a gas activation treatment or a chemical activation treatment, e.g., an alkali activation treatment using an alkali metal hydroxide as an activation assistant, and the system is then washed with a strong acid such as hydrochloric acid, nitric acid, sulfuric acid or the like in order to remove alkali metals and heavy metals from the product of the activation treatment.

However, in cases where activated carbon washed with a strong acid is used as a raw material in electronic devices, e.g., an electrode material in non-aqueous electrolyte secondary batteries or electrical double layer capacitors, problems such as shorting and the like occur as a result of dendrite formation caused by the reductive deposition of alkali metals and heavy metals; furthermore, self-discharging tends to occur as a result of alkali metal ions and heavy metal ions, so that the problem of a low rate of electrostatic capacitance retention due to self-discharging is encountered (below, the rate of electrostatic capacitance retention due to self-discharging will be abbreviated to "the rate of self-discharge retention").

Especially in the case of an alkali activation treatment using an alkali metal hydroxide as an activation assistant, since the alkali metal hydroxide is strongly oxidizing compound, corrosion of the heating furnace used for activation occurs during the activation treatment, and heavy metals are admixed with the product of the activation treatment, so that even if this product of the activation treatment is washed with hydrochloric acid or nitric acid, it is extremely difficult to manufacture activated carbon from which heavy metals have been completely eliminated. If activated carbon containing admixed heavy metals is used as a raw material in electronic devices, e.g., as a raw material for polarizing electrodes in an electrical double layer capacitor, heavy metal particles formed into dendrites will be formed on the separators of such electrical double layer capacitors by the reductive deposition of heavy metals as described above, so that problems such as the opening of holes in the separators or the like occur, thus leading to trouble such as short-circuiting or the like. Furthermore, there may be cases in which alkali metals originating in the alkali metal hydroxides used as activation reagents remain in the activated carbon. If such activated carbon is used as a raw material for polarizing electrodes in electrical double layer capacitors, the leakage current is increased, so that the charging efficiency drops, thus resulting in a poor energy efficiency (in other words, the rate of self-discharge retention drops).

For example, an electrical double layer capacitor using activated carbon with an Fe content of 200 ppm or less, a Cr content of 10 ppm or less, an Ni content of 10 ppm or less, an Na content of 200 ppm or less, a Cl content of 300 ppm or less and an ash content of 0.5% or less as a polarizing electrode material has been proposed in Japanese Patent Application Laid-Open No. 1-241811. In this publication, it is indicated that metal components are admixed in the manufacturing process of the activated carbon, and that the elution of these metal components causes a drop in the long-term reliability of the electrical double layer capacitor. However, there is no description of how to suppress such metal contents in order to realize a reliable electrical double layer capacitor, although it is described that the elution of these metal components causes a drop in the long-term reliability of the electrical double layer capacitor.

Furthermore, activated carbon for use in the polarizing electrodes of electrical double layer capacitors which allows the use of an alkali activation process, and which is manufactured by washing with water, an acid solution and then an alkali solution following activation, is disclosed in Japanese Patent Application Laid-Open No. 2002-43190, and it is indicated that self-discharge can be reduced by reducing the Ni content. However, an electrical double layer capacitor with desired performance cannot be constructed merely by reducing the Ni content.

Accordingly, it is an object of the present invention to provide activated carbon which does not lead to dendrite formation by the reductive deposition of alkali metals or heavy metals when used as a raw material in electronic devices, so that problems such as short-circuiting tend not to occur, and which shows a high rate of self-discharge retention, so that this activated carbon is suitable for use in applications such as electronic devices and the like.

DISCLOSURE OF THE INVENTION

The present inventors discovered that the abovementioned problems encountered in the prior art are caused by excessive overall contents of alkali metals and/or heavy metals in activated carbon, and adjusting the overall contents of alkali metals and/or heavy metals in activated carbon to specified numerical values or less is therefore an effective means of preventing the occurrence of the abovementioned problems. Furthermore, the present inventors also discovered that the reason for such excessive overall contents of alkali metals and/or heavy metals in activated carbon is as follows: specifically, in cases where activated carbon (or the product of an activation treatment) is washed with a strong acid, alkali metal salts and/or heavy metals remaining in the form of hydroxides or the like (e.g., nickel hydroxide, copper hydroxide, zinc hydroxide and the like) which have a high affinity for activated carbon and a relatively low solubility in water are difficult to be removed from the activated carbon, so that considerable amounts of alkali metals and/or such heavy metals remain in the activated carbon. Furthermore, the present inventors also discovered that (i) alkali metals can be removed from activated carbon by using carbonic acid to convert these alkali metals into carbonates, thus lowering the affinity between the alkali metals and activated carbon and increasing the water solubility of the alkali metals, (ii) heavy metals can be removed from activated carbon by using basic substances to convert the heavy metals into complexes, thus lowering the affinity between the heavy metals and activated carbon and increasing the water solubility of the heavy metals, (iii) heavy metals can be removed by washing the product of an activation treatment with an acidic aqueous solution containing an oxidizing agent, and (iv) alkali metals (hydroxides, carbonates and the like) can be removed more efficiently in cases where such an activation treatment product is washed with hot water than in cases where this product is washed with water at an ordinary temperature; moreover, heavy metals (hydroxides and the like) can be efficiently removed by washing such a product with hot hydrochloric acid. The present inventors perfected the present invention on the basis of these findings.

Specifically, the first invention of the present application provides activated carbon which is obtained by subjecting a carbonaceous material to an activation treatment, wherein the overall content of alkali metals in the activated carbon is 100 ppm or less. Furthermore, the first invention of the present application provides a method for manufacturing activated carbon, comprising by subjecting a carbonaceous material to an activation treatment, and then washing the activation treatment product thus obtained with a liquid containing a carbonic acid to give the activated carbon.

The second invention of the present application provides activated carbon which is obtained by subjecting a carbonaceous material to an activation treatment, wherein the overall content of heavy metal in the activated carbon is 20 ppm or less. Furthermore, the second invention of the present application provides a method for manufacturing activated carbon, comprising subjecting a carbonaceous material to an activation treatment, and then washing the activation treatment product thus obtained with a liquid containing a basic substance to give the activated carbon.

The third invention of the present application provides activated carbon in which the effect of the invention is heightened by specifying the carbonaceous material in the second invention as an easily graphitizable carbonaceous material and specifying the activation treatment as an alkali activation treatment, that is, provides an activated carbon obtained by subjecting an easily graphitizable carbonaceous material to an alkali activation treatment, wherein in the activated carbon, the overall content of heavy metals is 20 ppm or less, and the overall content of alkali metals is 200 ppm or less. Furthermore, the third invention of the present application provides a method for manufacturing activated carbon, comprising subjecting an easily graphitizable carbonaceous material to an alkali activation treatment, and washing the activation treatment product thus obtained with an acidic aqueous solution that contains an oxidizing agent, to give the activated carbon. Furthermore, the third invention of the present application provides a method for manufacturing activated carbon, comprising subjecting an easily graphitizable carbonaceous material to an alkali activation treatment, and then washing the activation treatment produced thus obtained with hot water, hot hydrochloric acid and water in that order, or washing this product with hot water, carbonated water, hot hydrochloric acid, aqueous ammonia and hot water in that order, or washing this product with hot water, carbonated water, hot hydrochloric acid, aqueous ammonia, hot hydrochloric acid and hot water in that order, to give the activated carbon.

Furthermore, the fourth invention of the present application provides a polarizing electrode which is formed by mixing the activated carbon of the first, second or third invention of the present application with at least a binder and a conductive material, and also provides an electrical double layer capacitor using this polarizing electrode.

BEST MODE FOR CARRYING OUT THE INVENTION

Figure 1:
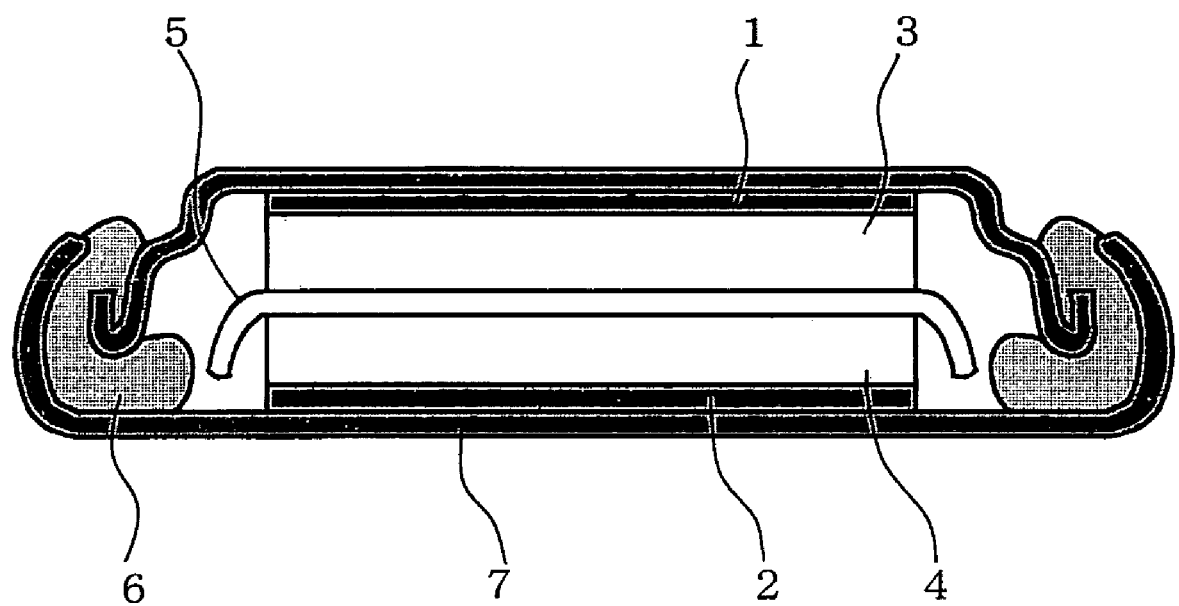
FIG. 1 is a sectional schematic diagram which shows one example of the electrical double layer capacitor of the present invention.

First, the first invention of the present application will be described.

The activated carbon of the first invention of the present application is obtained by subjecting a carbonaceous material to an activation treatment. Here, the overall content of alkali metals in the activated carbon of the present invention is 100 ppm or less. The reason for this is as follows: specifically, if the overall content of alkali metals exceeds 100 ppm, the formation of metal dendrites by reductive deposition will occur in cases where the activated carbon is used as a raw material in electronic devices, thus leading to problems such as short-circuiting and the like, and causing a drop in the rate of electrostatic capacitance retention due to metal ions.

In the first invention of the present application, examples of alkali metals that may be contained in the activated carbon include lithium, sodium, potassium and cesium. Ordinarily, sodium and/or potassium show large contents, and it is important to control these contents. In some cases, furthermore, alkali metals may be present as metallic alkalies in the activated carbon; ordinarily, however, these alkali metals are present in the form of oxides, hydroxides, chlorides or the like.

The overall content of alkali metals in the activated carbon can be measured by atomic absorption analysis.

Means of reducing the overall content of alkali metals in the activated carbon of the first invention of the present application to 100 ppm or less include repeated washing with ion exchange water, strongly acidic aqueous solutions or the like. To the means, the activated carbon manufacturing method of the present invention, which is characterized in that washing is performed using a liquid containing carbonic acid (described later), is preferably applied.

There are no particular restrictions on the carbonaceous raw material used in the first invention of the present application, as long as this material can be converted into activated carbon by carbonization and/or activation. Examples of materials that can be used include plant-derived materials, e.g., wood, sawdust, coconut shells, nut shells (charcoal) such as walnut shells or the like, fruit pits (charcoal), lignin and the like, mineral materials such as peat, peat moss, lignite, brown coal, bituminous coal, anthracite, coke, coal tar, coal pitch, petroleum distillation residue, petroleum pitch and the like, natural materials such as cotton, rayon and the like, and synthetic materials such as phenol resins, acrylics, vinylon and the like.

Furthermore, there are no particular restrictions on the activation treatment; conventional universally known gas activation treatments and chemical activation treatments may be used.

The activated carbon of the first invention of the present application described above can be manufactured in a preferable manner by the activated carbon manufacturing method of the first invention of the present application, which will be described below.

Specifically, the activated carbon manufacturing method of the first invention of the present application is a method in which activated carbon is obtained by subjecting a carbonaceous material to an activation treatment, and then washing the activation treatment product thus obtained with a liquid containing carbonic acid (carbonic acid washing treatment). As a result of the activation treatment product being subjected to a carbonic acid washing treatment, the alkali metals contained in the activated carbon are converted into alkali carbonates that show a high water solubility; accordingly, the alkali metal content remaining in the activated carbon can be reduced to 100 ppm or less.

The "liquid containing carbonic acid" used in the carbonic acid washing treatment is preferably carbonated water. There are no particular restrictions on the concentration of carbonic acid in this carbonated water; ordinarily, however, this concentration is 0.1 wt % to 10 wt %.

Furthermore, there are no particular restrictions on the amount of the abovementioned "liquid containing carbonic acid" that is used in the carbonic acid washing treatment. In practical terms, an amount ranging from 1 to 100 parts by weight per part by weight of the activation treatment product that is to be washed is preferable; in particular, if the operating characteristics and alkali metal removal efficiency are taken into consideration, an amount ranging from 2 to 50 parts by weight is more preferable, and an amount ranging from 5 to 20 parts by weight is especially preferable.

There are no particular restrictions on the temperature during the carbonic acid washing treatment. However, if the temperature is too high, the carbonic acid concentration in the "liquid containing carbonic acid" will drop, so that the alkali metal removal efficiency shows an excessive drop. On the other hand, if the temperature is too low, the alkali metal removal efficiency will drop in terms of the reaction rate. Accordingly, the temperature is preferably 0 to 50° C., and is even more preferably 0 to 45° C.

Furthermore, in the carbonic acid washing treatment, there are no particular restrictions on the number of times that the activation treatment product is washed with the "liquid containing carbonic acid". However, the number of times that this washing is performed is ordinarily 1 to 3 times in accordance with the quantities of alkali metals remaining in the activated carbon and the desired alkali metal concentration levels.

There are no particular restrictions on the pressure that is applied when the activation treatment product is washed with the "liquid containing carbonic acid" in the carbonic acid washing treatment. However, if this pressure is too high, special pressure-applying means must be installed in the washing apparatus; accordingly, the pressure is preferably atmospheric pressure to 1 MPa, and is even more preferably atmospheric pressure to 0.5 MPa.

After activated carbon is obtained by washing the activation treatment product with the "liquid containing carbonic acid" as described above (carbon acid washing treatment), if necessary, it is preferable that a hydrochloric acid washing treatment be performed to remove heavy metals (e.g., nickel, copper, zinc or the like) contained in very small amounts in the activated carbon.

There are no particular restrictions on the concentration of the hydrochloric acid used in the hydrochloric acid washing treatment. The concentration of hydrochloric acid that is generally commercially marketed is sufficient. Accordingly, it is preferable that the concentration of the hydrochloric acid used be 0.01 to 37 wt %; in particular, if the operating characteristics and safety are taken into account, a concentration of 0.1 to 30 wt % is even more preferable, and a concentration of 0.5 to 25 wt % is especially preferable.

There are no particular restrictions on the temperature at which the hydrochloric acid washing treatment is performed. However, if this temperature is too high, the hydrochloric acid tends to volatilize, and if this temperature is too low, the heavy metal removal efficiency may drop. Accordingly, this temperature is preferably in the range of 10 to 90° C., and is even more preferably in the range of 20 to 90° C.

Furthermore, there are no particular restrictions on the number of times that the hydrochloric acid washing treatment is performed. However, although this number of times also depends on the amounts of alkali metals that remain in the activated carbon, and the desired alkali metal concentration levels, the number of times that the treatment is performed is generally 1 to 3 times.

It is preferable that the activated carbon that has been subjected to the above-mentioned hydrochloric acid washing treatment then be subjected to a clean water washing treatment using distilled water or ion exchange water. Activated carbon obtained by performing a carbonic acid washing treatment may also be immediately subjected to a clean water washing treatment without performing a hydrochloric acid washing treatment.

There are no particular restrictions on the amount of distilled water or ion exchange water that is used in the clean water washing treatment. However, it is preferable that washing be performed until chlorine ions can no longer be detected. In concrete terms, it is preferable that the amount of water used be in common 1 to 10,000 parts by weight per part by weight of activated carbon, although this also depends on the type of clean water washing system used as described later), and if economy and operating characteristics are taken into account, an amount ranging from 1 to 1000 parts by weight is even more preferable.

Examples of clean water washing systems that can be used include systems in which washing while agitating is performed using a tank equipped with an agitator, systems in which washing is performed by using a filter and passing the liquid through under reduced pressure or pressurization, or the like.

The activated carbon that is obtained by washing with a liquid containing carbonic acid, or the activated carbon obtained by further performing a hydrochloric acid washing treatment and/or a clean water washing treatment if necessary, is dried under heating and/or reduced pressure, thus producing activated carbon in a dry state.

Furthermore, in the activated carbon manufacturing method of the first invention of the present application, a carbonization treatment using an ordinary method in accordance with the type of carbonaceous material involved (e.g., a dry distillation treatment at 400 to 800° C.) may be performed prior to the activation treatment if necessary.

In the manufacturing method of the first invention of the present application, a carbonaceous material is subjected to an activation treatment. There are no particular restrictions on the treatment method used; a conventional universally known gas activation treatment method or chemical activation treatment method may be used.

For instance, activation treatments using steam, carbon dioxide, oxygen, propane combustion waste gas, mixed gases consisting of these gases or the like may be cited as examples of gas activation treatments, and activation treatments using chemicals such as zinc chloride, calcium chloride, phosphoric acid, sulfuric acid, sodium hydroxide, potassium hydroxide, magnesium hydroxide, calcium hydroxide or the like may be cited as examples of chemical activation treatments. In particular, in cases where a general alkali activation treatment using potassium hydroxide or sodium hydroxide as a chemical agent is performed, alkali metals tend to remain in the activated carbon, since an alkali metal hydroxide is used as the activation assistant. Accordingly, in cases where a common alkali activation treatment is performed, the manufacturing method of the first invention of the present application can be applied in a preferable manner.

Next, the second invention of the present application will be described.

The activated carbon of the second invention of the present application is activated carbon which is obtained by subjecting a carbonaceous material to an activation treatment, wherein the overall content of heavy metals in activated carbon is 20 ppm or less. The reason for this is as follows: specifically, if the overall content of heavy metals exceeds 20 ppm, then dendrite formation caused by the reductive deposition of heavy metals will occur in cases where the activated carbon is used as a raw material in electronic devices, thus leading to problems such as short-circuiting and the like, and resulting in a drop in the rate of self-discharge retention. Furthermore, in cases where the activated carbon is used (for example) as an adsorbent material in the manufacture of clean water, heavy metals will continue to be eluted (though in small amounts) in the clean water that is obtained.

In the second invention of the present application, nickel, copper, zinc, iron, silver and the like may be cited as examples of heavy metals contained in the activated carbon. Among these, the metals that ordinarily show large contents are nickel, copper, zinc and iron, and it is important to control the contents of these metals. In particular, it is preferable that the nickel content be controlled to 8 ppm or less, that the copper content be controlled to 1 ppm or less, that the zinc content be controlled to 1 ppm or less, that the iron content be controlled to 0.3 ppm or less, and that the silver content be controlled to 0.1 ppm or less.

The contents of heavy metals in the activated carbon can be measured by inductively coupled plasma emission spectrometry analysis (ICP).

Repeated washing with, e.g., ion exchange water or a strongly acidic aqueous solution may be cited as means of reducing the overall content of heavy metals in the activated carbon of the second invention of the present application to 20 ppm or less; preferably, however, to the means, the activated carbon manufacturing method of the present invention, which is characterized in that washing is performed with a liquid containing a basic substance (described later), is applied.

The carbonaceous raw materials used in the second invention of the present application are as described in the first invention of the present application.

Furthermore, there are no particular restrictions on the activation treatment used; conventional universally known gas activation treatment methods and chemical activation treatment methods may be used.

The above-mentioned activated carbon of the second invention of the present application can be preferably manufactured by the activated carbon manufacturing method of the second invention of the present application, which will be described below.

Specifically, the activated carbon manufacturing method of the second invention of the present application is a method in which activated carbon is obtained by subjecting a carbonaceous material to a gas activation treatment or chemical activation treatment, and then washing the activation treatment product thus obtained with a liquid containing a basic substance (basic washing treatment). As a result of the activation treatment product thus being subjected to a basic washing treatment, the heavy metals contained in this product form complexes which show a high water solubility; accordingly, the content of heavy metals remaining in the activated carbon can be reduced to 20 ppm or less.

The "liquid containing a basic substance" that is used in the basic washing treatment is preferably an aqueous solution in which a basic substance such as ammonia, organic amine, ammonium carbonate, a mixture of these substance or the like is dissolved in water. Here, from the standpoint of ease of removal of the basic substance from the activated carbon, ammonia, an organic amine or a mixture of these substances is preferable as the above-mentioned basic substance. Examples of organic amines include methylamine, ethylamine, propylamine, dimethylamine, diethylamine, dipropylamine, trimethylamine, triethylamine and the like.

Furthermore, there are no particular restrictions on the concentration of the basic substance contained in the "liquid containing a basic substance"; ordinarily, however, this concentration is 0.1 to 10 wt %.

Furthermore, there are likewise no particular restrictions on the amount of the "liquid containing a basic substance" that is used in the basic washing treatment. In practical terms, an amount ranging from 1 to 100 parts by weight per part by weight of the activation treatment product that is to be washed is preferable; in particular, if the alkali metal removal efficiency is taken into account, an amount ranging from 2 to 50 parts by weight is more preferable, and an amount ranging from 5 to 20 parts by weight is especially preferable.

There are no particular restrictions on the temperature during the basic washing treatment. However, if this temperature is too high, the basic substance tends to volatilize from the "liquid containing a basic substance", and if this temperature is too low, the heavy metal removal efficiency drops in terms of the reaction rate. Accordingly, this temperature is preferably 10 to 60° C., and is even more preferably 20 to 50° C.

Furthermore, there are no particular restrictions on the number of times that the activation treatment product is washed with the "liquid containing a basic substance" in the basic washing treatment; however, this number of times is ordinarily 1 to 3 times in accordance with the amounts of heavy metals remaining in the activated carbon and the desired heavy metal concentration levels.

There are no particular restrictions on the pressure that is applied when the activation treatment product is washed with the "liquid containing a basic substance" in the basic washing treatment. However, if this pressure is too high, special pressure-applying means must be installed in the washing apparatus. Accordingly, this pressure is preferably a pressure ranging from atmospheric pressure to 1 MPa, and is even more preferably a pressure ranging from atmospheric pressure to 0.5 MPa.

After activated carbon is obtained by washing the activation treatment product with the "liquid containing a basic substance" (basic washing treatment) as described above, it is preferable that this product be further washed with hydrochloric acid in order to remove the basic substance if necessary.

There are no particular restrictions on the concentration of the hydrochloric acid used in the hydrochloric acid washing treatment; the concentration of common commercially available hydrochloric acid is sufficient. Accordingly, a concentration of 0.01 to 37 wt % is preferable as the concentration of the hydrochloric acid used, and in particular, if the operating characteristics and safety are taken into account, a concentration of 0.1 to 30 wt % is even more preferable, and a concentration of 0.5 to 25 wt % is especially preferable.

There are no particular restrictions on the temperature at which the hydrochloric acid washing treatment is performed. However, if this temperature is too high, the hydrochloric acid tends to volatilize, and if this temperature is too low, the heavy metal removal efficiency may drop. Accordingly, this temperature is preferably in the range of 10 to 90° C., and is even more preferably in the range of 20 to 90° C.

Furthermore, there are no particular restrictions on the number of times that the hydrochloric acid washing treatment is performed; ordinarily, however, this treatment is performed 1 to 3 times, although this also depends on the type and concentration level of the basic substance remaining in the activated carbon.

It is preferable that the activated carbon that has been subjected to the above-mentioned hydrochloric acid washing treatment then be subjected to a clean water washing treatment with distilled water or ion exchange water. The activated carbon obtained by the basic washing treatment may also be immediately subjected to a clean water washing treatment without being subjected to a hydrochloric acid washing treatment.

There are no particular restrictions on the amount of distilled water or ion exchange water that is used in the clean water washing treatment. However, it is preferable that washing be performed until chlorine ions or the basic substance can no longer be detected. In concrete terms, although this also depends on the clean water washing system (described later), it is ordinarily preferable that the amount of water used be 1 to 10,000 parts by weight per parts by weight of activated carbon, and if economy and operating characteristics are taken into account, an amount ranging from 1 to 1000 parts by weight is even more preferable.

Examples of clean water washing systems that can be used include systems in which washing while agitating is performed using a tank equipped with an agitator, systems in which washing is performed by passing the liquid through a filter under reduced pressure or pressurization, or the like.

The activated carbon that is obtained by washing with a liquid containing a basic substance, or the activated carbon obtained by further performing a hydrochloric acid washing treatment and/or a clean water washing treatment if necessary, is dried under heating and/or reduced pressure, thus producing activated carbon in a dry state.

Furthermore, in the activated carbon manufacturing method of the second invention of the present application, a carbonization treatment using an ordinary method in accordance with the type of carbonaceous material involved (e.g., a dry distillation treatment at 400 to 800° C.) may be performed prior to the activation treatment if necessary.

In the manufacturing method of the second invention of the present application as well, an easily graphitizable carbonaceous material is subjected to a gas activation treatment or chemical activation treatment. There are no particular restrictions on the treatment method used; the gas activation treatment methods or chemical activation treatment methods described in the first invention of the present application may be used.

For instance, activation treatment methods using steam, carbon dioxide, oxygen, propane combustion waste gas, mixed gases consisting of these gases or the like may be cited as examples of gas activation treatment methods, and activation treatment methods using chemicals such as zinc chloride, calcium chloride, phosphoric acid, sulfuric acid, sodium hydroxide, potassium hydroxide, magnesium hydroxide, calcium hydroxide or the like may be cited as examples of chemical activation treatment methods. In particular, in cases where a general alkali activation treatment using potassium hydroxide or sodium hydroxide as a chemical agent is performed, alkali metals tend to remain in the activated carbon, since an alkali metal hydroxide is used as the activation assistant. Accordingly, in cases where a common alkali activation treatment is performed, the manufacturing method of the second invention of the present application can be applied in a preferable manner.

Next, the third invention of the present application will be described.

The activated carbon of the third invention of the present application is activated carbon in which the effect of the invention is heightened by specifying the carbonaceous material in the second invention as an easily graphitizable carbonaceous and specifying the activation treatment as an alkali activation treatment, this activated carbon being obtained by subjecting an easily graphitizable carbonaceous material to an alkali activation treatment. Here, in the activated carbon of the third invention of the present application, the heavy metal content is 20 ppm or less. The reason for this is as follows: specifically, if the heavy metal content exceeds 20 ppm, then in cases where the activated carbon is used as a raw material in electronic devices, heavy metals will be deposited in the electronic devices, leading to problems such as short-circuiting and the like, and resulting in a drop in a rate of self-discharge retention. Furthermore, in the activated carbon of the third invention of the present application, the alkali metal content is 200 ppm or less. The reason for this is as follows: specifically, if the alkali metal content exceeds 200 ppm, leakage current is increased and the charging efficiency drops, so that the energy efficiency is poor, and a rate of self-discharge retention is low.

In the activated carbon of the third invention, nickel, iron, zinc, tin, copper, silver and the like may be cited as examples of heavy metals that may be contained in the activated carbon. Among these, heavy metals that show large contents are ordinarily one or more of the metals nickel, iron and zinc, so that it is important to control the contents of these metals. In particular, it is preferable that the nickel content be controlled to 8 ppm or less, that the iron content be controlled to 0.3 ppm or less, and that the zinc content be controlled to 0.3 ppm or less. Furthermore, it is preferable that the copper content be controlled to 1 ppm or less, and that the silver content be controlled to 0.1 ppm or less.

As was described above, the contents of heavy metals in the activated carbon can be measured by inductively coupled plasma emission spectrometry analysis (ICP).

Furthermore, in the third invention of the present application, lithium, sodium, potassium and cesium may be cited as examples of alkali metals that may be contained in the activated carbon. Ordinarily, the metals that show large contents are sodium and/or potassium so that it is important to control the contents of these metals. Furthermore, although there may also be cases in which alkali metals are present as metallic alkalies in the activated carbon, these alkali metals are ordinarily present in the form of oxides, hydroxides, chlorides, carbonates or the like.

As was described above, the contents of alkali metals in the activated carbon can be measured by atomic absorption analysis.

In the activated carbon of the third invention of the present application, it is further preferable that the carbon content extracted by means of a hydrocarbon such as benzene, toluene, xylene, mesitylene, a mixture of these hydrocarbons or the like be 0.2 wt % or less. If this carbon content exceeds 0.2 wt %, this may lead to pore blockage, a drop in the electrostatic capacitance and a deterioration in the durability of the activated carbon, so that such a carbon content is unpreferable. Here, the following series of operations may be cited as an example of the extraction operation: specifically, using 5 to 50 parts by weight of a hydrocarbon per part by weight of activated carbon, these ingredients are mixed for 1 hour or longer at a temperature exceeding the boiling point of the hydrocarbon used, after which the hydrocarbon is filtered out, and the product is dried. The calculation of the carbon content extracted by means of this hydrocarbon is accomplished by comparing the weights before and after the extraction operation. Furthermore, in the activated carbon of both the first and second inventions of the present application, it is preferable that the carbon content extracted by means of the above-mentioned hydrocarbon be 0.2 wt % or less.

Repeated washing with ion exchange water or a strongly acidic aqueous solution and the like may be cited as means of reducing the overall content of heavy metals in the activated carbon of the third invention of the present application to 20 ppm or less; preferably, however, the activated carbon manufacturing method of the present invention, which is characterized in that washing is performed with an acidic aqueous solution containing an oxidizing agent (described later), is applied. Furthermore, repeated washing with ion exchange water or a strongly acidic aqueous solution at room temperature may be cited as means of reducing the heavy metal content of the activated carbon of the third invention of the present application to 20 ppm or less, and at the same time reducing the alkali metal content to 200 ppm or less; preferably, however, the activated carbon manufacturing method of the present invention, which is characterized in that washing is performed with at least hot water and hot hydrochloric acid (describe later) is applied.

Examples of carbonaceous materials that can be used in the third invention of the present application include easily graphitizable carbonaceous materials which form activated carbon when subjected to an activation treatment, e.g., carbonaceous materials whose starting raw materials are petroleum coke, petroleum pitch, synthetic mesophase pitch, polyvinyl chlorides, polyimides, polyacrylonitriles or the like. In particular, mesophase pitch carbon fibers are preferable for use. From the standpoint of superior conductivity, fibers that contain an optically anisotropic phase at the rate of 50 vol % or greater, preferably 80 vol % or greater, are preferable as mesophase pitch carbon fibers.

Here, mesophase pitch carbon fibers are fibers obtained by subjecting a synthetic mesophase pitch or a mesophase pitch originating from petroleum or coal to melt spinning, and then subjecting the obtained melt-spun fibers to an infusibilizing treatment and a carbonization treatment. If the operating characteristics of melt spinning, productivity, operating characteristics during activation and electrostatic capacitance of the activated carbon obtained are taken into account, the use of a synthetic mesophase pitch is preferable. Here, the infusibilizing treatment is a treatment which is required in order to subject the melt-spun pitch fibers to an activation (heat) treatment while maintaining the configuration of the fibers "as is". Ordinarily, this is a treatment in which melt-spun pitch fibers are heated to a temperature of approximately 100 to 350° C. in an oxidizing atmosphere such as air containing 1 to 20.9% oxygen or the like. The carbonization treatment performed following the infusibilizing treatment is a treatment in which the product of the infusibilizing treatment is carbonized by heating this product in an inert gas atmosphere. If the heating temperature is too low, over-activation will occur due to incomplete development of the carbon crystal structure, so that the density tends to show an excessive drop; on the other hand, if this temperature is too high, crystallization of the carbon fibers will progress to an excessive extent, so that activation tends not to proceed. Accordingly, the heating temperature is preferably 500 to 1000° C., and is even more preferably 600 to 900° C.

In the third invention of the present application, the carbonaceous material is preferably used in a pulverized state. In order to ensure good mixing with the alkali metal hydroxide used as an activation assistant, so that the alkali activation treatment (described later) is caused to proceed in an effective manner, it is preferable to use a pulverized material in which the maximum length in the direction of the long axis is 500 µm or less, preferably 200 µm or less. For example, the maximum length in the direction of the long axis can be confirmed by observing electron micrographs of randomly extracted samples of the pulverized carbonaceous material. Pulverization can be accomplished using a universally known pulverizer such as a cone crusher, double roll crusher, disk crusher, rotary crusher, ball mill, centrifugal roller mill, ring roll mill, centrifugal ball mill, turbo mill or the like.

A conventional universally known alkali activation treatment using an alkali metal hydroxide as an activation assistant may be cited as an example of the alkali activation treatment used in the third invention of the present application.

The activated carbon of the third invention of the present application described above can be manufactured in a preferable manner by the activated carbon manufacturing method of the third invention of the present application, which will be described below.

Specifically, the activated carbon manufacturing method of the third invention of the present application is a method in which activated carbon is obtained by subjecting a easily graphitizable to an alkali activation treatment, and then washing the activation treatment product thus obtained with an acidic aqueous solution containing an oxidizing agent. As a result of this washing using an acidic aqueous solution containing an oxidizing agent, the heavy metals contained in the activation treatment product migrate to the side of the cleaning liquid. Accordingly, the content of heavy metals remaining in the activated carbon can be reduced to 20 ppm or less. The reason for this is unclear; however, it is thought that the heavy metals contained in the activation treatment product are cleaned and removed because by washing the activation treatment product with an acidic aqueous solution containing an oxidizing agent, these metals become ionic compounds with good water solubility.

In the manufacturing method of the third invention of the present application, an easily graphitizable carbonaceous material is first subjected to an alkali activation treatment, so that an activation treatment product is obtained. Here, the alkali activation treatment is a treatment in which an easily graphitizable carbonaceous material is mixed by ordinary methods with an alkali metal hydroxide constituting an activation assistance, and the mixture thus obtained is activated by heating in an inert gas atmosphere such as nitrogen gas or the like.

Examples of alkali metal hydroxides that can be used as activation assistants include sodium hydroxide, potassium hydroxide, lithium hydroxide and the like. Among these, it is preferable to use sodium hydroxide or potassium hydroxide in order to obtain activated carbon that shows a large electrostatic capacitance. These alkali metal hydroxides may be used singly or in mixtures. Furthermore, the alkali metal hydroxides may also be used in the form of a powder or in the form of a concentrated aqueous solution.

In regard to the amount of alkali metal hydroxide that is used relative to the easily graphitizable carbonaceous material, if this amount is too small, it is difficult to perform a sufficient and uniform activation treatment, so that some variation may occur in the properties of the desired activated carbon. Conversely, if this amount is too large, the process becomes uneconomical, and there is a danger that activation will proceed to an excessive extent, so that while the electrostatic capacity per unit weight tends to increase, a drop in the electrostatic capacity per unit volume is generated. Accordingly, taking economy, operating characteristics and safety into account, the amount of alkali metal hydroxide used relative to the carbonaceous material is preferably 30 to 500 parts by weight, and even more preferably 50 to 300 parts by weight, per 100 parts by weight of the carbonaceous material.

In regard to the heating temperature conditions used to activate the easily graphitizable carbonaceous raw that is mixed with the above-mentioned alkali metal hydroxide, if the heating temperature is too low, the activation will be insufficient. On the other hand, if the temperature is too high, the crystallization of the activated carbon that is obtained will progress so that the electrostatic capacitance drops when the activated carbon is used as an electrode in an electrical double layer capacitor; moreover, the danger caused by alkali metals generated from the alkali metal hydroxide used is increased, and even if a material based on nickel, which has a high resistance to alkali metals, is used in the activation furnace, grain boundary corrosion accompanying crystallization of the metal material (furnace material) will be accelerated, so that the admixture of heavy metal particles in the activated carbon is conspicuously increased. Accordingly, a temperature of 400° C. to 1000° C. is preferable, and a temperature of 450° C. to 900° C. is even more preferable, as a heating temperature for accomplishing activation (activation temperature); furthermore, if economy related to the quantity of heat is taken into account, a temperature of 470° C. to 850° C. is especially preferable.

Taking the problem of grain boundary crystallization of the abovementioned activation vessel into account, the rate of temperature elevation to the activation temperature is preferably 0.2° C. to 10° C./minute, and is even more preferably 0.3 to 8° C./min, in order to avoid an abrupt temperature elevation.

There are no particular restrictions on the retention time at the activation temperature, as long as this is a time that allows the transfer of a sufficient quantity of heat to the activated carbon; ordinarily, this time is 30 minutes to 5 hours, and if the progression of crystallization along with this retention is taken into account, the time is preferably 45 minutes to 4 hours.

The rate of cooling from the activation temperature is important from the standpoint of avoiding grain boundary crystallization of the activation furnace body. Specifically, since rapid cooling promotes metal crystallization, the cooling rate is preferably 1 to 50° C./minute, and is even more preferably 1 to 30° C./minute.

Next, in the manufacturing method of the third invention of the present application, the activation treatment product obtained by subjecting the above-mentioned easily graphitizable carbonaceous to an alkali activation treatment is washed with an "acidic aqueous solution containing an oxidizing agent" (oxidizing agent washing treatment). As a result of the activation treatment produced being subjected to an oxidizing agent washing treatment, heavy metals admixed from the furnace body subjected to grain boundary corrosion as a result of being oxidized during the alkali activation treatment by the use of an alkali metal hydroxide can be effectively removed from the activation treatment product.

Furthermore, it is also preferable that the activation treatment product be washed beforehand with warm water prior to the oxidizing agent washing treatment. As a result of this washing, alkali metal hydroxides, alkali metal carbonates and the like remaining in the activation treatment product can be removed. Specifically, by maximizing the removal of substances that can react with an acidic aqueous solution from the activation treatment product by washing with warm water when the oxidizing agent washing treatment is performed, it is possible to reduce that amount of the "acidic aqueous solution containing an oxidizing agent" that is used. There are no restrictions on the temperature or amount of warm water that is used; ordinarily, however, the temperature is 30° C. to 90° C., and the amount used is preferably 3 to 50 parts by weight per part by weight of the activation treatment product that is to be washed. Taking the washing efficiency and volumetric efficiency of the reaction vessel into account, the amount used is even more preferably 5 to 45 parts by weight.

In the manufacturing method of the third invention of the present application, examples of oxidizing agents that can be used in the "acidic aqueous solution containing an oxidizing agent" include inorganic oxidizing agents such as hydrogen peroxide, persulfuric acid and the like, organic per-acids such as peracetic acid, performic acid and the like, and organic peroxides such as t-butyl hydroperoxide and the like. In particular, taking into account stability in the acidic aqueous solution, availability, safety and effect on the carbon material, hydrogen peroxide is most preferable.

The concentration of the oxidizing agent in such an "acidic aqueous solution containing an oxidizing agent" is preferably 0.1 to 10 wt %. If economy and effect on the carbon material are taken into account, the concentration is more preferably 0.2 to 5 wt %, and is most preferably 0.5 to 2 wt %.

Examples of acid aqueous solutions that can be used as the "acidic aqueous solution containing an oxidizing agent" include aqueous solutions of organic acids such as formic acid, acetic acid and the like, and aqueous solutions of inorganic acids such as hydrochloric acid, sulfuric acid, nitric acid and the like. Among these acids, inorganic acids such as hydrochloric acid, sulfuric acid, nitric acid and the like are preferable from the standpoint of the effect in reducing the residual amounts of metals; furthermore, if presence of acidic radicals on the carbonaceous material is taken into account, the use of hydrochloric acid is most preferable. Furthermore, the concentration of the acid is preferably 0.1 to 5 N; if the ability to remove metals and the effects on the carbon material are taken into account, a concentration of 0.2 to 4 N is even more preferable, and if economy and operating characteristics are taken into account, a concentration of 0.5 to 3 N is especially preferable.

The amount of the "acidic aqueous solution containing an oxidizing agent" that is used relative to the activation treatment product is preferably 3 to 50 parts by weight per part by weight of the activation treatment product that is to be washed. If operating characteristics and economy are taken into account, this amount is even more preferably 4 to 30 parts by weight, and is most preferably 5 to 20 parts by weight.

There are no particular restrictions on the washing temperature during the oxidizing agent washing treatment. However, if this temperature is too high, this will lead to the decomposition of the peroxide constituting the oxidizing agent, and oxidation of the carbon material may proceed. On the other hand, if this temperature is too low, the effect of the oxidizing agent tends to drop. Accordingly, this temperature is preferably 0° C. to 50° C., and is even more preferably 0° C. to 45° C.

There are no particular restrictions on the number of times that the oxidizing agent washing treatment is performed; this number of times also depends on the amounts of metals remaining in the activation treatment product and the desired residual metal amount levels in the activated carbon, and is ordinarily in the range of 1 to 3 times.

There are no particular restrictions on the pressure that is applied when the activation treatment product is washed with the "acidic aqueous solution containing an oxidizing agent" in the oxidizing agent washing treatment. However, if this pressure is too high, a special apparatus is required; ordinarily, therefore, this pressure is a pressure ranging from atmospheric pressure to 1 MPa, and is preferably a pressure ranging from atmospheric pressure to 0.5 MPa.

Activated carbon is obtained by performing an oxidizing agent washing treatment on the activation treatment product; however, it is preferable that the activated carbon that is obtained be further washed with distilled water or ion exchange water (clean water washing treatment). There are no particular restrictions on the amount of distilled water or ion exchange water that is used in the clean water washing treatment; however, it is preferable to wash this product until chlorine ions can no longer be detected. Although this amount also depends on the washing system used, it is ordinarily preferable that the amount used be in the range of 1 part by weight to 10,000 parts by weight per part by weight of activated carbon; if economy and operating characteristics are taken into account, the amount is even more preferably 1 part by weight to 1000 parts by weight per part by weight of activated carbon.

Examples of clean water washing systems that can be used include systems in which washing while agitating performed using a tank equipped with an agitator, systems in which washing is performed by passing the liquid through a filter under reduced pressure or pressurization, or the like.

The activated carbon that is obtained by washing with the above-mentioned "acidic aqueous solution containing an oxidizing agent", or the activated carbon that is obtained by a further hydrochloric acid washing treatment and/or clean water washing treatment if necessary, is dried under heating and/or a reduced pressure, so that activated carbon in a dry state is produced.

Furthermore, this third invention of the present application provides a manufacturing method in which a easily graphitizable carbonaceous material to an alkali activation treatment, and the activation treatment product thus obtained is (1) washed with hot water, hot hydrochloric acid and water in that order, (2) washed with hot water, carbonated water, hot hydrochloric acid, aqueous ammonia and hot water in that order, or (3) washed with hot water, carbonated water, hot hydrochloric acid, aqueous ammonia, hot hydrochloric acid and hot water in that order, as a manufacturing method which is suitable for manufacturing activated carbon in which not only the overall content of heavy metals is 20 ppm or less, but also the overall content of alkali metals is 200 ppm or less.

Here, the solubility of alkali metal compounds such as alkali metal hydroxides, alkali metal carbonates and the like in hot water is greatly improved compared to the solubility of such compounds in cold water. Furthermore, the reactivity of heavy metals with hot hydrochloric acid is greatly improved compared to the reactivity of such metals with hydrochloric acid at room temperature. Accordingly, by washing the activation treatment product with hot hydrochloric acid, it is possible to convert the heavy metals contained in the activation treatment product into chlorides that are readily soluble in water. Consequently, the content of heavy metals remaining in the activated carbon can be reduced to 20 ppm or less, and the content of alkali metals can be reduced to 200 ppm or less, by washing the activation treatment product with hot water, and then washing this produced with hot hydrochloric acid. Furthermore, in the manufacturing method of the present invention, it is sufficient to arrange the system so that the water and hydrochloric acid used for washing are heated; accordingly, activated carbon can be manufactured at a high yield without greatly modifying conventional alkali activation treatment equipment.

In the abovementioned procedure of (1) in the manufacturing method of the third invention of the present application, the activation treatment product obtained by the alkali activation treatment of a carbonaceous material is first washed with hot water (hot water washing), and is then washed with hot hydrochloric acid (hot hydrochloric acid washing), followed by a washing with water (water washing). Here, alkali metal hydroxides, alkali metal carbonates and the like remaining in the activation treatment product can be efficiently removed by washing with hot water. Furthermore, the hot water washing makes it possible to remove substances capable of reacting with the acidic aqueous solution in the subsequent hot hydrochloric acid washing, so that the effect of the hot hydrochloric acid can be heightened, and so that the amount of acidic aqueous solution that is used can be reduced. There are no restrictions on the temperature and amount of hot water used; the temperature is preferably 30° C. to 95° C., and is even more preferably 60 to 90° C., while the amount of hot water used is preferably 3 to 50 parts by weight per part by weight of the activation treatment product that is to be washed, and is even more preferably 5 to 45 parts by weight if the washing efficiency and volumetric efficiency of the reaction vessel are taken into account.

Next, the activation treatment product that has been washed with hot water is washed with hot hydrochloric acid. In regard to the concentration of the hydrochloric acid, if this concentration is too low, this may lead to passive states of the heavy metals so that the removal efficiency drops; on the other hand, if this concentration is too high, the treated activated carbon is chlorinated. Accordingly, it is preferable to perform this treatment in a concentration range of 0.1 to 3 N, preferably 0.5 to 2.5 N. Furthermore, in regard to the temperature of hot hydrochloric acid that is used, if this temperature is too low, the ability to remove partially oxidized heavy metals drops, and the passive states of heavy metals in hydroxide or carbonate form is promoted, so that the metal removal efficiency may drop. On the other hand, if this temperature is too high, the volatilization of hydrochloric acid becomes severe, so that the efficiency of the hydrochloric acid drops, and so that the problem of corrosion of the equipment used also becomes severe. Accordingly, a temperature range of 60° C. to 90° C. is appropriate for the use temperature of the hot hydrochloric acid. The amount of hot hydrochloric acid used is preferably 3 to 50 parts by weight per part by weight of the activation treatment product that is to be washed; if operating characteristics and economy are taken into account, an amount of 4 to 30 parts by weight is even more preferable, and an amount of 5 to 20 parts by weight is most preferable.

Next, the activation treatment product that has been washed with hot water and washed with hot hydrochloric acid is washed with water. As a result, activated carbon is obtained. Since this activated carbon is affected by residual metals contained in the water used, it is preferable that clean water such as ion exchange water, distilled water, water that has passed through a membrane or the like be used as the wash water. There are no particular restrictions on the amount of wash water used; however, it is preferable that washing be performed until chlorine ions can no longer be detected. Although this amount also depends on the washing system used, the amount used is ordinarily in the range of 1 part by weight to 10,000 parts by weight per part by weight of activated carbon, and if economy and operating characteristics are taken into account, it is preferable to use an amount in the range of 1 part by weight to 1000 parts by weight per part by weight of activated carbon.

Examples of clean water washing systems that can be used include systems in which washing while agitating is performed using a tank equipped with an agitator, systems in which washing is performed by and passing the liquid through using a filter under reduced pressure or pressurization, or the like.

In the manufacturing method of the third invention of the present application, there are no particular restrictions on the pressure that is applied when the hot water washing, hot hydrochloric acid washing and water washing are performed. However, if this pressure is too high, a special apparatus is required. Ordinarily, therefore, this pressure is a pressure in the range of atmospheric pressure to 1 MPa, and is preferably a pressure in the range of atmospheric pressure to 0.5 MPa.

Furthermore, in the abovementioned procedure of (2) in the manufacturing method of the third invention of the present application, the activation treatment product obtained by subjecting a carbonaceous material to an alkali activation treatment is first washed with hot water (hot water washing), and is then washed with carbonated water (carbonated water washing), washed with hot hydrochloric acid (hot hydrochloric acid washing), washed with aqueous ammonia (aqueous ammonia washing), and washed with hot water (hot water washing). The points of difference from the procedure of (1) are the abovementioned washing with carbonated water, washing with aqueous ammonia, and final washing with hot water. Here, the carbonated water washing operation is an operation that is performed in order to remove the alkali metals in the activation treatment product as carbonates, and is performed in the same manner as in the case described in the manufacturing method of the first invention of the present application.

Furthermore, the aqueous ammonia washing operation is an operation which is used to remove heavy metals in the activation treatment product as ammonia complexes, and is performed in the same manner as in the case described in the manufacturing method of the second invention of the present application.

Moreover, the final hot water washing operation can be performed in the same manner as the hot water washing operation of the above-mentioned procedure of (1).

Furthermore, in the abovementioned procedure of (3) in the manufacturing method of the third invention of the present application, the activation treatment product that has been obtained by subjecting a carbonaceous material to an alkali activation treatment is first washed with hot water (hot water washing), and is then washed with carbonated water (carbonated water washing), washed with hot hydrochloric acid (hot hydrochloric acid washing), washed with aqueous ammonia (aqueous ammonia washing), again washed with hot hydrochloric acid, and washed with hot water (hot water washing). The point of difference from the procedure of (2) is that hot hydrochloric acid washing is again performed following washing with aqueous ammonia.

This hot hydrochloric acid washing is as was described above; ammonia-derived substances (residues, metal complexes) in the activation treatment product can be removed by this washing operation.

The activated carbon obtained by the manufacturing method of the third inventions of the present application described above is dried under heating and/or a reduced pressure, thus producing activated carbon in a dry state.

The activated carbon of the first, second and third inventions of the present application described above is especially useful as a material for polarizing electrodes used in electrical double layer capacitors. Accordingly, the fourth invention of the present application provides a polarizing electrode which is formed by mixing the activated carbon of the first, second or third invention of the present application with at least a binder and a conductive material, and an electrical double layer capacitor using this electrode.

The polarizing electrode of the fourth invention of the present application will be described below.

The polarizing electrode of the fourth invention of the present application is formed by mixing at least a binder such as a polyvinylidene fluoride, polytetrafluoroethylene or the like and a conductive material such as carbon black or the like with the activated carbon of the first, second or third invention of the present application, and molding this mixture. The resistance of the electrode can be lowered by mixing a conductive material; as a result, this is effective in lowering the internal resistance of the polarizing electrode.

Ordinary known methods can be used in order to manufacture such a polarizing electrode suitable for use in an electrical double layer capacitor. For example, a substance known as a binder, such as a commercially available marketed polyvinylidene fluoride, polytetrafluoroethylene or the like, and a conductive material such as carbon black or the like can be added, as necessary, in amounts up to a few percent, and then thoroughly kneaded. Afterward, this mixture can be molded into an electrode by press-molding in a metal mold or rolling into the form of a sheet, and punching the resulting body into the required shape. Alternatively, the kneaded mixture may be applied as a coating to a current collector, and formed into a coating electrode. Solvents such as water, organic compounds such as alcohol, N-methylpyrrolidone and the like, dispersing agents and various types of additives may be used as necessary in this electrode formation process. Furthermore, heat may be applied within limits that cause no loss of the effect of the invention.

The polarizing electrode described above is useful as an electrode in the electrical double layer capacitor of the fourth invention of the present application, which is shown in FIG. 1 (schematic sectional view). The respective constituent elements that constitute the capacitor shown in FIG. 1 can be constructed in the same manner as in a universally known electrical double layer capacitor, except for the fact that the polarizing electrode of the present invention is used. For example, in the FIGURE, 1 and 2 indicate current collecting members comprised of aluminum or the like, 3 and 4 indicate polarizing electrodes consisting of the activated carbon of the present invention, 5 indicates a separator constructed from a polypropylene non-woven fabric or the like, 6 indicates a gasket constructed from a polypropylene, polyethylene, polyamide, polyamidoimide, polybutylene or the like, and 7 indicates a case constructed from a material such as stainless steel or the like.

Furthermore, in order to cause this device to function as an electrical double layer capacitor, an electrolyte solution prepared by dissolving a universally known electrolyte such as tetraethylammonium tetrafluoroborate, tetramethylammonium tetrafluoroborate or the like in a solvent, e.g., a carbonate such as ethylene carbonate, dimethyl carbonate, diethyl carbonate, propylene carbonate or the like, a nitrile such as acetonitrile or the like, a lactone such as γ-butyrolactone, α-methyl-γ-butyrolactone or the like, a sulfoxide such as dimethyl sulfoxide or the like, or an amide such as dimethylformamide or the like, must be sealed inside the case 7.

Since the electrical double layer capacitor of the construction shown in FIG. 1 uses the activated carbon of the present invention, this capacitor shows the rate of high self-discharge retention.

EXAMPLES

The present invention will be described more concretely below by referring to the Examples.

Example A1

An optically anisotropic pitch with a Mettler softening point of 285° C. obtained by heat-treating a petroleum decomposition residue was spun by melt blow-spinning using a nozzle which had 1000 spinning holes with a diameter of 0.2 mm in a slit having a width of 2 mm, and these spun fibers were subjected to an infusibilizing treatment and a carbonization treatment, thus producing mesophase pitch carbon fibers.

50 g of mesophase pitch fibers that were pulverized so that the maximum length of the fibers in the direction of the long axis was 20 μm or less, and 10 g of 95% potassium hydroxide that was pulverized to a mean particle size of 1 mm or less were places in a 300-mL (milliliter) glass separable flask in which a thermometer and agitator were mounted, and this mixture was agitated at 10 rpm while nitrogen was caused to flow through at a rate of 200 mL/minute. This separable flask was heated by means of an oil bath, and the mixture was agitated for 1 hour at an internal temperature of 160° C. Afterward, the heat source was removed, and the mixture was agitated for an additional hour while nitrogen was passed through the system, thus producing a granular substance. The granular substance had a size of 20 mm or less. Next, the granular substance was dehydrated under a reduced pressure of 1.5 Torr, with the temperature elevated to 300° C. over a period of 5 hours at a temperature elevation rate of 2° C./minute.

24 g of the dehydrated granular substance thus obtained was placed in a 2-inch horizontal nickel reaction vessel in which a thermometer was mounted, and after the air inside the system was replaced with nitrogen, the temperature was elevated to 700° C. at a rate of 200° C./hour under a nitrogen current of 100 mL/minute. After the temperature reached 700° C., this temperature was maintained for 1 hour; afterward, the system was cooled to room temperature over a period of 2 hours. Nitrogen passing through a distilled water bubbler was passed through the system or 1 hour, and the reaction mixture was then placed in 150 mL of water.

After the supernatant was removed by decantation, 150 mL of water was again added, and the system was agitated. The supernatant was removed by decantation; then, 100 mL of carbonated water (carbonic acid concentration 1 wt %) was added at 10° C. and the system was agitated, after which the supernatant was removed by decantation. This operation was performed twice; afterward, 200 mL of a 1 N aqueous solution of hydrochloric acid was added, and the system was neutralized and washed. Then, the system was continuously washed using 3 L of distilled water so that alkali metal salts were removed. The system was then dried to produce 6.7 g of activated carbon.

Comparative Example A1

Activated carbon was obtained by repeating the same operation as in Example A1, except that washing with carbonated water was not performed.

Example A2

5.9 g of activated carbon was obtained by repeating the same operation as in Example A1, except that the carbon material used was 50 g of a carbonized phenolic resin pulverized to 20 μm or less.

Comparative Example A2

Activated carbon was obtained by repeating the same operation as in Example A2, except that washing with carbonated water was not performed.

(Evaluation)

100-mg samples of the respective activated carbon products obtained in Examples A1 and A2 and Comparative Examples A1 and A2 were subjected to wet decomposition using 200 mL of nitric acid, and then 20 mL of perchloric acid. Afterward, the residual potassium and sodium metal components were measured using an atomic absorption analysis device (Deflecting Zeeman atomic absorption photometer Z-5300, manufactured by Hitachi Seisakusho K.K.). The results obtained are shown in Table 1. Furthermore, measurements were also performed for other alkali metal components (lithium, cesium); however, the contents of these components were below the detection limit (1 ppm). Accordingly, the overall alkali metal content was substantially equal to the total-content of potassium and sodium.

Furthermore, the respective activated carbon products obtained in Examples A1 and A2 and Comparative Examples A1 and A2 were further pulverized to a mean particle size of 5 to 20 μm, thus producing powdered activated carbon samples, and mixtures consisting of 80 wt % of powdered activated carbon, 10 wt % of conductive carbon and 10 wt % of polytetrafluoroethylene (Teflon (registered trademark) 6J, Mitsui-du Pont Chemical Col.) were kneaded. The kneaded mixtures thus obtained were molded into sheets with a thickness of 300 μm by rolling, and were punched into circular shapes with a diameter of 2 cm using a punching device. Afterward, sheet-form polarizing electrodes were manufactured by drying these punched sheets for 4 hours at 150° C. under reduced pressure.

Using the polarizing electrodes thus obtained, a current collecting member, polarizing electrode sheet, polypropylene non-woven fabric, polarizing electrode sheet and current collecting member were laminated in this order in a stainless steel case (as shown in FIG. 1) inside a glove box with a dew point of −80° C. or less. Afterward, the polarizing electrodes were impregnated with a propylene carbonate solution containing 1 mole of tetraethylammonium tetrafluoroborate, and were sealed by crimping to the upper lid of the stainless steel case using an insulating gasket made of polypropylene, thus producing electrical double layer capacitors.

The electrical double layer capacitors thus obtained were charged with a constant current at 2 mA/cm² relative to the electrode surface area up to an attained voltage of 2.5 V at room temperature using an electrical double layer capacitor evaluation device manufactured by HIOKI E.E. CORPRATION, and were then subjected to supplementary charging at a low voltage for 30 minutes at 2.5 V. Following the completion of supplementary charging, a charge-discharge cycle test in which a constant-current discharge was performed at 2 mA/cm² was repeated 10 times, and the initial electrostatic capacitance was determined by a conventional method on the basis of the discharge curve from 1.2 V to 1.0 V in this case. The results obtained are shown in Table 1.

The electrical double layer capacitors whose electrostatic capacitance had thus been determined were charged with a constant current at 2 mA/cm² relative to the electrode surface area up to an attained voltage of 2.5 V at room temperature, and were then subjected to supplementary charging at a low voltage for 30 minutes at 2.5 V. Following the completion of supplementary charging, the capacitors were allowed to stand for 50 hours; afterward, a constant-current discharge was performed at 2 mA/cm², and the electrostatic capacitance after the capacitors were allowed to stand was determined by a conventional method on the basis of the discharge curve form 1.2 V to 1.0 V in this case. The rate of self-discharge retention (%) was determined by dividing this value by the previously determined initial electrostatic capacitance. The results obtained are shown in Table 1.

TABLE 1

|  | Example | | Comparative Example | |
| --- | --- | --- | --- | --- |
|  | A1 | A2 | A1 | A2 |
| Na content (ppm) | 6 | 2 | 3 | 4 |
| K content (ppm) | 54 | 84 | 226 | 156 |
| Overall alkali metal content (ppm) | 60 | 86 | 229 | 160 |
| Initial electrostatic capacitance (F/cc) | 28.5 | 17.0 | 28.3 | 17.1 |
| Electrostatic capacitance after standing (F/cc) | 27.9 | 16.8 | 25.1 | 15.3 |
| Rate of self-discharge retention (%) | 97.8 | 98.8 | 88.0 | 89.4 |

As is seen from Table 1, the electrical double layer capacitors manufactured from the activated carbon of Example A1 and Example A2, in which the overall alkali metal content was 100 ppm or less, showed the rates of self-discharge retention close to 100%, and thus showed superior performance as electrical double layer capacitors.

On the other hand, the electrical double layer capacitors manufactured from the activated carbon of Comparative Example A1 and Comparative Example A2, in which the overall alkali metal content exceeded 100 ppm, showed the rate of self-discharge retention of less than 90%, and thus did not show sufficient performance as electrical double layer capacitors.

Example B1

An optically anisotropic pitch with a Mettler softening point of 285° C. obtained by heat-treating a petroleum decomposition residue was spun by melt blow-spinning using a nozzle which had 1000 spinning holes with a diameter of 0.2 mm in a slit having a width of 2 mm, and these spun fibers were subjected to an infusibilizing treatment and a carbonization treatment, thus producing mesophase pitch carbon fibers.

50 g of mesophase pitch fibers that were pulverized so that the maximum length of the fibers in the direction of the long axis was 20 μm or less, and 100 g of 95% potassium hydroxide that was pulverized to a mean particle size of 1 mm or less were places in a 300-mL (milliliter) glass separable flask in which a thermometer and agitator were mounted, and this mixture was agitated at 10 rpm while nitrogen was caused to flow through at a rate of 200 mL/minute. This separable flask was heated by means of an oil bath, and the mixture was agitated for 1 hour at an internal temperature of 160° C. Afterward, the heat source was removed, and the mixture was agitated for an additional hour while nitrogen was passed through the system, thus producing a granular substance. The granular substance had a size of 20 mm or less. Next, the granular substance was dehydrated under a reduced pressure of 1.5 Torr, with the temperature elevated to 300° C. over a period of 5 hours at a temperature elevation rate of 2° C./minute.

24 g of the dehydrated granular substance thus obtained was placed in a 2-inch horizontal nickel reaction vessel in which a thermometer was mounted, and after the air inside the system was replaced with nitrogen, the temperature was elevated to 700° C. at a rate of 200° C./hour under a nitrogen current of 100 mL/minute. After the temperature reached 700° C., this temperature was maintained for 1 hour; afterward, the system was cooled to room temperature over a period of 2 hours. Nitrogen passing through a distilled water bubbler was passed through the system or 1 hour, and the reaction mixture was then placed in 150 mL of water.

After the supernatant was removed by decantation, 150 mL of water was again added, and the system was agitated. The supernatant was removed by decantation; then, 100 mL of 5% aqueous ammonia was added at 30° C. and the system was agitated, after which the supernatant was removed by decantation. This operation was performed twice; afterward, 200 mL of a 1 N aqueous solution of hydrochloric acid was added, and the system was neutralized and washed. Then, the system was continuously washed using 3 L of distilled water so that salts were removed. The system was then dried to produce 6.4 g of activated carbon.

Comparative Example B1

Activated carbon was obtained by repeating the same operation as in Example B1, except that washing with aqueous ammonia was not performed.

Example B2

5.9 g of activated carbon was obtained by repeating the same operation as in Example B1, except that 50 g of a carbonized phenolic resin pulverized to 20 μm or less was used as the carbon material in Example B1.

Comparative Example B2

Activated carbon was obtained by repeating the same operation as in Example B2, except that washing with aqueous ammonia was not performed.

(Evaluation)

100-mg samples of the respective activated carbon products obtained in Examples B1 and B2 and Comparative Examples B1 and B2 were subjected to wet decomposition using 200 mL of nitric acid, and then 20 mL of perchloric acid. Afterward, the contents of residual heavy metals including nickel, copper, zinc and iron were measured using an inductively coupled plasma emission spectrometry analysis device (ICP analysis device, IRIS AP manufactured by Thermo Electron Corporation). The results obtained are shown in Table 2.

Furthermore, the respective activated carbon products obtained in Examples B1 and B2 and Comparative Examples B1 and B2 were further pulverized to a mean particle size of 5 to 20 μm, thus producing powdered activated carbon samples, and mixtures consisting of 80 wt % powdered activated carbon, 10 wt % conductive carbon and 10 wt % polytetrafluoroethylene (Teflon (registered trademark) 6J, Mitsui-du Pont Chemical Col.) were kneaded. The kneaded mixtures thus obtained were molded into sheets with a thickness of 300 μm by rolling, and were punched into circular shapes with a diameter of 2 cm using a punching device. Afterward, sheet-form polarizing electrodes were manufactured by drying these punched sheets for 4 hours at 150° C. under reduced pressure.

Using the polarizing electrodes thus obtained, a current collecting member, polarizing electrode sheet, polypropylene non-woven fabric, polarizing electrode sheet and current collecting member were laminated in this order in a stainless steel case (as shown in FIG. 1) inside a glove box with a dew point of −80° C. or less. Afterward, the polarizing electrodes were impregnated with a propylene carbonate solution containing 1 mole of tetraethylammonium tetrafluoroborate, and were sealed by crimping to the upper lid of the stainless steel case using an insulating gasket made of polypropylene, thus producing electrical double layer capacitors.

The electrical double layer capacitors thus obtained were charged with a constant current at 2 mA/cm$^2$ relative to the electrode surface area up to an attained voltage of 2.5 V at room temperature using an electrical double layer capacitor evaluation device manufactured by HIOKI E.E. CORPORATION, and were then subjected to supplementary charging at a low voltage for 30 minutes at 2.5 V. Following the completion of supplementary charging, a charge-discharge cycle test in which a constant-current discharge was performed at 2 mA/cm$^2$ was repeated 10 times, and the initial electrostatic capacitance was determined by a conventional method on the basis of the discharge curve from 1.2 V to 1.0 V in this case. The results obtained are shown in Table 2.

The electrical double layer capacitors whose electrostatic capacitance had thus been determined were charged with a constant current at 2 mA/cm$^2$ relative to the electrode surface area up to an attained voltage of 2.5 V at room temperature, and were then subjected to supplementary charging at a low voltage for 30 minutes at 2.5 V. Following the completion of supplementary charging, the capacitors were allowed to stand for 50 hours; afterward, a constant-current discharge was performed at 2 mA/cm$^2$, and the electrostatic capacitance after the capacitors were allowed to stand was determined by a conventional method on the basis of the discharge curve form 1.2 V to 1.0 V in this case. The rate of self-discharge retention (%) was determined by dividing this value by the previously determined initial electrostatic capacitance. The results obtained are shown in Table 2.

TABLE 2

|  | Example | | Comparative Example | |
| --- | --- | --- | --- | --- |
|  | B1 | B2 | B1 | B2 |
| Ni content (ppm) | 6 | 27 | 4 | 31 |
| Cu content (ppm) | 0.1 | 0.3 | 1.1 | 1.04 |
| Zn content (ppm) | 0.05 | 0.07 | 0.09 | 0.12 |
| Fe content (ppm) | 0.12 | 0.18 | 0.41 | 0.47 |
| Overall heavy metal content (ppm) | 8.5 | 4.9 | 30.1 | 33.2 |
| Initial electrostatic capacitance (F/cc) | 33.2 | 31.5 | 23.5 | 23.4 |
| Electrostatic capacitance after standing (F/cc) | 30.4 | 27.7 | 22.1 | 18.4 |
| Rate of self-discharge retention (%) | 97.4 | 91.1 | 87.9 | 78.6 |

As is seen from Table 2, the electrical double layer capacitors manufactured from the activated carbon of Example B1 and Example B2, in which the overall heavy metal content was 20 ppm or less, showed the rate of self-discharge retention of 90% or greater, and thus showed superior performance as electrical double layer capacitors.

On the other hand, the electrical double layer capacitors manufactured from the activated carbon of Comparative Example B1 and Comparative Example B2, in which the overall heavy metal content exceeded 20 ppm, showed the rates of self-discharge retention of less than 90%, and thus did not show sufficient performance as electrical double layer capacitors.

Example C1

An optically anisotropic pitch with a Mettler softening point of 285° C. obtained by heat-treating a petroleum decomposition residue was spun by melt blow-spinning using a nozzle which had 1000 spinning holes with a diameter of 0.2 mm in a slit having a width of 2 mm, and these spun fibers were subjected to an infusibilizing treatment and a carbonization treatment, thus producing mesophase pitch carbon fibers.

The mesophase pitch carbon fibers thus obtained were pulverized to 0.02 mm, and 200 g of 95% potassium hydroxide was added and mixed with 100 g of the pulverized fibers thus obtained. This mixture was placed in a nickel reaction tube with a diameter of 4 inches in which a nitrogen introduction tube and a off-gassing line were mounted. This reaction tube was set in a cylindrical furnace, and the temperature was elevated to 700° C. at a temperature elevation rate of 3.3° C./minute while nitrogen was caused to flow through at a rate of 100 milliliters (mL)/minute. The system was maintained at this temperature for 1 hour. Afterward, the system was cooled to room temperature at a rate of 5° C./minute, thus producing an activation treatment product.

The activation treatment product thus obtained was placed in a pressurized filter with a diameter of 3 cm, and was washed at a pressure of 0.2 MPa using 2 liters (L) of ion exchange water at 60° C. Next, this product was washed at a temperature of 40° C. and a pressure of 0.2 MPa using 2 L of 1 N hydrochloric acid containing 1 wt % hydrogen peroxide. Furthermore, this product was then washed at a temperature of 60° C. and a pressure of 0.2 MPa using 4 L of ion exchange water, thus producing activated carbon. The activated carbon thus obtained was heated for 3 hours at 100° C., and was then heated for 8 hours at a pressure of 0.1 MPa and dried under reduced pressure, thus producing activated carbon in a dry state.

Example C2

Activated carbon was manufactured by the same operation as in Example C1, except that 1 N hydrochloric acid containing 2 wt % hydrogen peroxide was used as the acidic aqueous solution.

Comparative Example C1

Activated carbon was manufactured by the same operation as in Example C1, except that hydrochloric acid containing no hydrogen peroxide was used as the acidic aqueous solution.

(Evaluation)

0.2-g samples of the respective activated carbon products obtained in Examples C1 and C2 and Comparative Example C1 were subjected to wet decomposition using 240 mL of nitric acid, and then 20 mL of perchioric acid. Afterward, the residual contents of heavy metals including nickel, iron and zinc were measured using an inductively coupled plasma emission spectrometry analysis device (ICP analysis device, IRIS AP manufactured by Thermo Electron Corporation). The results obtained are shown in Table 3.

Furthermore, mixtures consisting of 81 wt % of activated carbon respectively obtained in Examples C1 and C2 and Comparative Example C1, 9 wt % of conductive carbon black (Denka Black, manufactured by Denki Kagaku Kogyo Co.) and 10 wt % of polytetrafluoroethylene (Teflon (registered trademark) 6J, manufactured by Mitsui-du Pont Chemical Co.) were kneaded. The kneaded mixtures thus obtained were molded into sheets with a thickness of 200 μm by rolling, and were punched into circular shapes with a diameter of 11 mm using a punching device. Afterward, sheet-form polarizing electrodes were manufactured by drying these punched sheets at 200° C. under reduced pressure.

Using the polarizing electrodes thus obtained, a current collecting member, polarizing electrode sheet, polypropylene non-woven fabric, polarizing electrode sheet and current collecting member were laminated in this order in a stainless steel case (as shown in FIG. 1) inside a glove box with a dew point of −80° C. or less. Afterward, the polarizing electrodes were impregnated with a propylene carbonate solution containing 1 mole of tetraethylammonium tetrafluoroborate, and were sealed by crimping to the upper lid of the stainless steel case using an insulating gasket made of polypropylene, thus producing electrical double layer capacitors.

The electrical double layer capacitors thus obtained were charged with a constant current at 4 mA/cm$^2$ relative to the electrode surface area up to an attained voltage of 2.7 V at room temperature using an electrical double layer capacitor evaluation device manufactured by HIOKI E.E. CORPORATION, and were then subjected to supplementary charging at constant voltage of 2.7 V until the charging current reached 1 mA/cm$^2$. Following the completion of this supplementary charging, constant-current charging was performed at 2 mA/cm$^2$, and the initial electrostatic capacitance was determined. After this charge-discharge cycle was repeated 50 times, constant-current charging at 4 mA/cm$^2$ relative to the electrode surface area was again performed up to an attained voltage of 2.7 V, and supplementary charging was performed at a constant voltage of 2.7 V until the charging current reached 1 mA/cm$^2$. Following the completion of this supplementary charging, the capacitors were allowed to stand for 50 hours; then, a constant-current discharge was performed at 2 m/cm$^2$, and the electrostatic capacitance after standing was determined. Then, the rate of self-discharge retention (%) was determined by dividing this electrostatic capacitance after standing by the previously determined initial electrostatic capacitance. The results obtained are shown in Table 3.

TABLE 3

|  | Example | | Comparative Example |
|---|---|---|---|
|  | C1 | C2 | C1 |
| Ni content (ppm) | 8 | 6 | 22 |
| Fe content (ppm) | 0.3 | 0.2 | 0.6 |
| Zn content (ppm) | 0.1 | 0.3 | 0.8 |
| Overall heavy metal content (ppm) | 10.3 | 8.6 | 23.6 |
| Initial electrostatic capacitance (F/cc) | 33.2 | 33.7 | 32.6 |
| Electrostatic capacitance after standing (F/cc) | 32.3 | 32.4 | 22.3 |
| Rate of Self-discharge retention (%) | 97.2 | 96.1 | 68.4 |

As is seen from Table 3, the electrical double layer capacitors manufactured from the activated carbon of Example C1 and Example C2, in which the overall heavy metal content was 20 ppm or less, showed the rates of self-discharge retention of 90% or greater, and thus showed superior performance as electrical double-layer capacitors.

On the other hand, the electrical double layer capacitor manufactured from the activated carbon of Comparative Example C1, in which the overall heavy metal content exceeded 20 ppm, showed the rate of self-discharge retention of less than 90%, and thus showed inadequate performance as an electrical double layer capacitor.

Example D1

An optically anisotropic pitch with a Mettler softening point of 285° C. obtained by heat-treating a petroleum decomposition residue was spun by melt blow-spinning using a nozzle which had 1000 spinning holes with a diameter of 0.2 mm in a slit having a width of 2 mm, and these spun fibers were subjected to an infusibilizing treatment and a carbonization treatment, thus producing mesophase pitch carbon fibers (manufactured by Petoka Materials).

The mesophase pitch carbon fibers thus obtained were pulverized to 0.02 mm, and 200 g of 95% potassium hydroxide was added and mixed with 100 g of the pulverized fibers thus obtained. This mixture was placed in a nickel reaction tube with a diameter of 4 inches in which a nitrogen introduction tube and a off-gassing line were mounted. This reaction tube was set in a cylindrical furnace, and the temperature was elevated to 700° C. at a temperature elevation rate of 3.3° C./minute while nitrogen was caused to flow through at a rate of 100 milliliters (mL)/minute. The system was maintained at this temperature for 1 hour. Afterward, the system was cooled to room temperature at a rate of 5° C./minute, thus producing an activation treatment product.

The activation treatment product thus obtained was placed in a pressurized filter with a diameter of 3 cm, and this product was washed at a pressure of 0.2 MPa using 2 liters (L) of ion exchange water at 80° C. Next, the product was washed at a pressure of 0.2 MPa using 2 L of 1 N hydrochloric acid at 80° C. Furthermore, the product was then washed at a temperature of 60° C. and a pressure of 0.2 MPa using 4 L of ion exchange water, thus producing activated carbon. The activated carbon thus obtained was heated for 3 hours at 100° C., and was then heated for 8 hours at a pressure of 0.1 MPa and dried under reduced pressure, thus producing activated carbon in a dry state.

Example D2

Activated carbon was manufactured by the same operation as in Example D1, except that 2 N hydrochloric acid was used instead of the 1 N hydrochloric acid used in Example D1.

Example D3

Activated carbon was manufactured by the same operation as in Example D1, except that the amount of ion exchange water at 80° C. that was used was changed from 2 L (in Example D1) to 1 L.

Comparative Example D1

Activated carbon was manufactured by the same operation as in Example D1, except that the washing with 1 N hydrochloric acid at 80° C. that was performed in Example D1 was performed at 20° C.

Comparative Example D2

Activated carbon was manufactured by the same operation as in Example D1, except that 4 N hydrochloric acid was used instead of the 1 N hydrochloric acid used in Example D1.

Comparative Example D3

Activated carbon was manufactured by the same operation as in Example D1, except that the washing with ion exchange water at 80° C. that was performed in Example D1 was performed at 20° C.

(Evaluation)

0.2-g samples of the respective activated carbon products obtained in Examples D1 through D3 and Comparative Examples D1 through D3 were subjected to wet decomposition using 240 mL of nitric acid, and then 20 mL of perchloric acid. Afterward, the residual contents of heavy metals including nickel were measured using an inductively coupled plasma emission spectrometry analysis device (ICP analysis device, IRIS AP manufactured by Thermo Electron Corporation). Furthermore, the residual contents of alkali metals including potassium metal were measured using an atomic absorption analysis device (Deflecting Zeeman atomic absorption photometer Z-5300, manufactured by Hitachi Seisakusho K.K.). The results obtained are shown in Table 4.

Furthermore, mixtures consisting of 81 wt % activated carbon respectively obtained in Examples D1 through D3 and Comparative Examples D1 through D3, 9 wt % conductive carbon black (Denka Black, manufactured by Denki Kagaku Kogyo Co.) and 10 wt % polytetrafluoroethylene (Teflon (registered trademark) 6J, manufactured by Mitsui-du Pont Chemical Co.) were kneaded. The kneaded mixtures thus obtained were molded into sheets with a thickness of 200 μm by rolling, and were punched into circular shapes with a diameter of 11 mm using a punching device. Afterward, sheet-form polarizing electrodes were manufactured by drying these punched sheets at 200° C. under reduced pressure.

Using the polarizing electrodes thus obtained, a current collecting member, polarizing electrode sheet, polypropylene non-woven fabric, polarizing electrode sheet and current collecting member were laminated in this order in a stainless steel case (as shown in FIG. 1) inside a glove box with a dew point of −80° C. or less. Afterward, the polarizing electrodes were impregnated with a propylene carbonate solution containing 1 mole of tetraethylammonium tetrafluoroborate, and were sealed by crimping to the upper lid of the stainless steel case using an insulating gasket made of polypropylene, thus producing electrical double layer capacitors.

The electrical double layer capacitors thus obtained were charged with a constant current at 4 mA/cm$^2$ relative to the electrode surface area up to an attained voltage of 2.7 V at room temperature using an electrical double layer capacitor evaluation device manufactured by HIOKI E.E. CORPORATION, and were then subjected to supplementary charging at constant voltage of 2.7 V until the charging current reached 1 mA/cm$^2$. Following the completion of this supplementary charging, constant-current charging was performed at 2 mA/cm$^2$, and the initial electrostatic capacitance was determined. After this charge-discharge cycle was repeated 50 times, constant-current charging at 4 mA/cm$^2$ relative to the electrode surface area was again performed up to an attained voltage of 2.7 V, and supplementary charging was performed at a constant voltage of 2.7 V until the charging current reached 1 mA/cm$^2$. Following the completion of this supplementary charging, the capacitors were allowed to stand for 50 hours; then, a constant-current discharge was performed at 2 mA/cm$^2$, and the electrostatic capacitance after standing was determined. Then, the rate of self-discharge retention (%) was determined by dividing this electrostatic capacitance after standing by the previously determined initial electrostatic capacitance. The results obtained are shown in Table 4.

TABLE 4

|  | Example | | | Comparative Example | | |
| --- | --- | --- | --- | --- | --- | --- |
|  | D1 | D2 | D3 | D1 | D2 | D3 |
| Alkali metal content (ppm) | 83 | 92 | 182 | 183 | 124 | 273 |
| K content (ppm) | 82 | 91 | 181 | 183 | 123 | 272 |
| Heavy metal content (ppm) | 14 | 13 | 13 | 21 | 22 | 18 |
| Ni content (ppm) | 7 | 4 | 11 | 18 | 21 | 12 |
| Fe content (ppm) | 6 | 7 | 1 | 1 | 0.5 | 4 |
| Cu content (ppm) | 0.1 | 0.1 | 0.1 | 0.2 | 0.1 | 0.2 |
| Zn content (ppm) | 0.1 | 0.1 | 0.1 | 0.15 | 0.08 | 0.25 |
| Ag content (ppm) | 0.05 | 0.02 | 0.06 | 0.09 | 0.02 | 0.07 |
| Initial electrostatic capacitance (F/cc) | 33.2 | 33.7 | 33.4 | 32.8 | 34.2 | 33.1 |
| Electrostatic capacitance after standing (F/cc) | 32.1 | 32.7 | 31.8 | 22.5 | 19.6 | 26.8 |
| Rate of Self-discharge retention (%) | 96.6 | 97.0 | 95.3 | 68.5 | 57.3 | 81.2 |

As is seen from Table 4, the electrical double layer capacitors manufactured from the activated carbon of Examples D1 through D3 in which the heavy metal content was 20 ppm or less and the alkali metal content was 200 ppm or less showed the rate of self-discharge retention of 90% or greater, and thus showed superior performance as electrical double layer capacitors.

On the other hand, the electrical double layer capacitors manufactured from the activated carbon of Comparative Examples D1 and D2, in which the alkali metal content did not exceed 200 ppm but the heavy metal content exceeded 20 ppm, and the electrical double layer capacitor manufactured from the activated carbon of Comparative Example D3, in which the heavy metal content did not exceed 20 ppm but the alkali metal content exceeded 200 ppm showed the rates of self-discharge retention of less than 90%, and thus showed inadequate performance as electrical double layer capacitors.

Example D4

An activation treatment product obtained in the same manner as in Example D1 was placed in a pressurized filter with a diameter of 3 cm, and was washed at a pressure of 0.2 MPa with 2 liters (L) of ion exchange water at 80° C. Next, this product was washed at a pressure of 0.2 MPa using 1 L of carbonated water with a carbonic acid concentration of 1 wt % at 20° C. Next, the product was washed at a pressure of 0.2 MPa with 2 L of a 1 N aqueous solution of hydrochloric acid at 80° C. Next, the product was washed at a pressure of 0.2 MPa with 0.5 L of 5% aqueous ammonia at 30° C. Finally, the product was washed with 3 L of ion exchange water at 60° C., and was dried to produce activated carbon.

Example D5

An activation treatment product obtained in the same manner as in Example D1 was placed in a pressurized filter with a diameter of 3 cm, and was washed at a pressure of 0.2 MPa with 2 liters (L) of ion exchange water at 80° C. Next, this product was washed at a pressure of 0.2 MPa using 1 L of carbonated water with a carbonic acid concentration of 1 wt % at 20° C. Next, the product was washed at a pressure of 0.2 MPa with 2 L of a 1 N aqueous solution of hydrochloric acid at 80° C. Next, the product was washed at a pressure of 0.2 MPa with 0.5 L of 5% aqueous ammonia at 30° C., and was then further washed at a pressure of 0.2 MPa with 0.5 L of a 1 N aqueous solution of hydrochloric acid at 80° C. Finally, the product was washed with 3 L of ion exchange water at 60° C., and was then dried to produce activated carbon.

(Evaluation)

0.2 g samples of the respective activated carbon products obtained in Examples D4 and D5 were subjected to wet decomposition using 240 mL of nitric acid, and then 20 mL of perchloric acid. Afterward, the residual contents of heavy metals including nickel were measured using an inductively coupled plasma emission spectrometry analysis device (ICP analysis device, IRIS AP manufactured by Thermo Electron Corporation). Furthermore, the residual contents of alkali metals including potassium metal were measured using an atomic absorption analysis device (Deflecting Zeeman atomic absorption photometer Z-5300, manufactured by Hitachi Seisakusho K.K.). The results obtained are shown in Table 5.

Furthermore, electrical double layer capacitors were manufactured in the same manner as in Example D1 using the activated carbon respectively obtained in Examples D4 and D5, and the initial electrostatic capacitance (F/cc), electrostatic capacitance after standing (F/cc) and the rate of self-discharge retention (%) were evaluated. The results obtained are shown in Table 5.

Furthermore, the carbon components extracted of the activated carbon obtained in Example D4 or D5 were measured as follows: specifically, 70 g samples of the activated carbon obtained in Examples D4 and D5 were respectively placed in a 1.5-L glass three-necked flask which was equipped with an agitator, a cooling condenser and a thermometer, and which contained 700 g of toluene. The samples were agitated and dispersed, and were heated to reflux for 1 hour at 115° C., so that a carbon component extraction treatment was performed. After the liquid mixture was cooled to room temperature, the liquid mixture was subjected to a filtration treatment, and the activated carbon that was filtered out was heated for 3 hours at 100° C., and was then dried under reduced pressure (heating for 8 hours at a pressure of 0.1 MPa), thus producing activated carbon in a dry state. The extraction weight loss was determined by comparing the weights of the activated carbon before and after the extraction treatment. The results obtained are shown in Table 5.

TABLE 5

| | Example | |
|---|---|---|
| | D4 | D5 |
| Alkali metal content (ppm) | 30 | 29 |
| K content (ppm) | 26 | 28 |
| Heavy metal content (ppm) | 0.4 | 0.3 |
| Ni content (ppm) | 0.2 | 0.2 |
| Fe content (ppm) | Below detection limit | Below detection limit |
| Cu content (ppm) | Below detection limit | Below detection limit |
| Zn content (ppm) | Below detection limit | Below detection limit |
| Ag content (ppm) | Below detection limit | Below detection limit |
| Extracted carbon component (wt %) | 0.09 | 0.08 |
| Initial electrostatic capacitance (F/cc) | 34.1 | 34.3 |
| Electrostatic capacitance after standing (F/cc) | 33.6 | 34.1 |
| Rate of Self-discharge retention (%) | 98.5 | 99.7 |

It was found that if washing is performed in the order of "hot water, carbonated water, aqueous ammonia, and hot water" (Example D4) or in the order of "hot water, carbonated water, aqueous ammonia, hot hydrochloric acid and hot water" (Example D5) instead of in the washing order used in Examples D1 through D3 (hot water, hot hydrochloric acid and water), both the alkali metal content and heavy metal content show a great drop, and that (in particular) the rate of self-discharge retention can be caused to approach 100%.

INDUSTRIAL APPLICABILITY

In the activated carbon of the first invention of the present application, the overall content of alkali metals is 100 ppm or less. Accordingly, in cases where this activated carbon is used as a raw material in electronic devices, the formation of dendrites by the reductive deposition of alkali metals tends not to occur, so that problems such as short-circuiting, etc., tend not to occur. Furthermore, this activated carbon shows a good rate of self-discharge retention, and in cases where (for example) this activated carbon is used as an adsorbent material in the manufacture of clean water, the elution of alkali metals into the clean water can be greatly suppressed, so that this activated carbon is suitable for use in applications relating to the manufacture of food products or drugs, the manufacture of clean water, electronic devices or the like.

Furthermore, in the second and third inventions of the present application, the overall content of heavy metals is 20 ppm or less. Accordingly, in cases where this activated carbon is used as a raw material in electronic devices, the formation of dendrites by the reductive deposition of alkali metals tends not to occur, so that problems such as short-circuiting, etc., tend not to occur. Furthermore, this activated carbon shows a good rate of self-discharge retention.

In particular, in the activated carbon of the third invention of the present application, the alkali metal content is 200 ppm or less. Accordingly, in cases where this activated carbon is used as a raw material in electronic devices, the formation of dendrites by the reductive deposition of alkali metals tends not to occur, so that problems such as short-circuiting, etc., tend not to occur. Furthermore, this activated carbon shows a good rate of self-discharge retention. Consequently, this activated carbon is suitable as a raw material for use in electrical and electronic devices such as electrical double layer capacitors.

The invention claimed is:

1. A method for manufacturing a polarizing electrode for an electrical double layer capacitor, comprising:
    subjecting an easily graphitizable carbonaceous material to an alkali activation treatment;
    washing the alkali activation treatment product thus obtained with a liquid comprising carbonic acid;
    washing the carbonic acid washed product with hydrochloric acid to give an activated carbon, and
    preparing the polarizing electrode by mixing and forming the hydrochloric acid washed activated carbon, at least one binder and a conductive material,
    wherein the activated carbon has an overall content of alkali metals of 60 ppm or less, and
    the easily graphitizable carbonaceous material is one selected from the group consisting of a petroleum coke, a petroleum pitch, a synthetic mesophase pitch, a polyvinyl chloride, a polyimide and a polyacrylonitrile.

2. A method for manufacturing a polarizing electrode for an electrical double layer capacitor, comprising:
    subjecting an easily graphitizable carbonaceous material to an alkali activation treatment;
    washing the alkali activation treatment product thus obtained with a liquid comprising a basic substance, and
    washing the obtained basic substance washed product with hydrochloric acid to give an activated carbon, and
    preparing the polarizing electrode by mixing and forming the activated carbon, at least one binder and a conductive material,
    wherein
    the activated carbon has an overall content of heavy metals of 20 ppm or less, and
    the easily graphitizable carbonaceous material is one selected from the group consisting of a petroleum coke, a petroleum pitch, a synthetic mesophase pitch, a polyvinyl chloride, a polyimide and a polyacrylonitrile.

3. A method for manufacturing a polarizing electrode for an electrical double layer capacitor, comprising:
    subjecting an easily graphitizable carbonaceous material to an alkali activation treatment,
    washing the alkali activation treatment product thus obtained with water of 60 to 90° C.,
    washing the water washed product with hydrochloric acid of 60 to 90° C., and
    washing the hydrochloric acid washed product with water in that order to give an activated carbon, and
    preparing the polarizing electrode by mixing and forming the washed activated carbon, at least one binder and a conductive material, wherein the activated carbon has an overall content of heavy metals of 20 ppm or less and an overall content of alkali metals of 200 ppm or less, and
    the easily graphitizable carbonaceous material is one selected from the group consisting of a petroleum coke, a petroleum pitch, a synthetic mesophase pitch, a polyvinyl chloride, a polyimide and a polyacrylonitrile.

4. A method for manufacturing a polarizing electrode for an electrical double layer capacitor, comprising:
    subjecting an easily graphitizable carbonaceous material to an alkali activation treatment;
    washing the alkali activation treatment product with water of 60 to 90° C.;
    washing the water washed product with carbonated water;
    washing the carbonated water washed product with hydrochloric acid of 60 to 90° C.;
    washing the hydrochloric acid washed product with aqueous ammonia;
    washing the aqueous ammonia washed product with water of 60 to 90° C. in that order to give an activated carbon; and
    preparing the polarizing electrode by mixing and forming the activated carbon, at least one binder and a conductive material; wherein
    the activated carbon has an overall content of heavy metals of 20 ppm or less and an overall content of alkali metals of 200 ppm or less, and
    the easily graphitizable carbonaceous material is one selected from the group consisting of a petroleum coke, a petroleum pitch, a synthetic mesophase pitch, a polyvinyl chloride, a polyimide and a polyacrylonitrile.

5. The method according to claim 4, wherein an activation assistant in the alkali activation treatment is sodium hydroxide, potassium hydroxide or a mixture of sodium hydroxide and potassium hydroxide.

6. The method according to claim 4, wherein a concentration of said hydrochloric acid is from 0.5 to 3 N.

7. A method for manufacturing a polarizing electrode for an electrical double layer capacitor, comprising:
    subjecting an easily graphitizable carbonaceous material to an alkali activation treatment;
    washing the alkali activation treatment product thus obtained with water of 60 to 90° C.;
    washing the water washed product with carbonated water;
    washing the carbonated water washed product with hydrochloric acid of 60 to 90° C.,
    washing the hydrochloric acid washed product with aqueous ammonia;
    washing the aqueous ammonia washed product with hydrochloric acid of 60 to 90° C.;
    washing the hydrochloric acid washed product with water of 60 to 90° C. in that order to give an activated carbon; and
    preparing the polarizing electrode by mixing and forming the activated carbon, at least one binder and a conductive material, wherein
    the activated carbon has an overall content of heavy metals of 20 ppm or less and an overall content of alkali metals of 200 ppm or less, and
    the easily graphitizable carbonaceous material is one selected from the group consisting of a petroleum coke, a petroleum pitch, a synthetic mesophase pitch, a polyvinyl chloride, a polyimide and a polyacrylonitrile.

8. The method according to claim 7, wherein an activation assistant in the alkali activation treatment is sodium hydroxide, potassium hydroxide or a mixture of sodium hydroxide and potassium hydroxide.

9. The method according to claim 7 wherein the concentration of said hydrochloric acid is from 0.5 to 3.0 N.

* * * * *